Inventors
John J. Gersic
Lawrence B. Nelson
Norman L. Malakoff
Harry T. Van Horn By Charles G. Huggett
Attorney March 26, 1963 J. J. GERSIC ET AL 3,083,154
DEWAXING AND DEOILING PROCESS
Filed Sept. 29, 1960 2 Sheets-Sheet 2
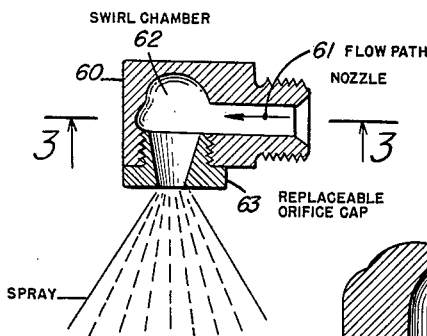
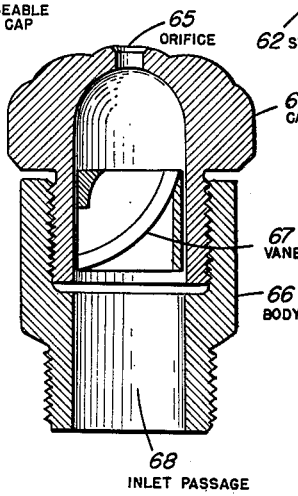
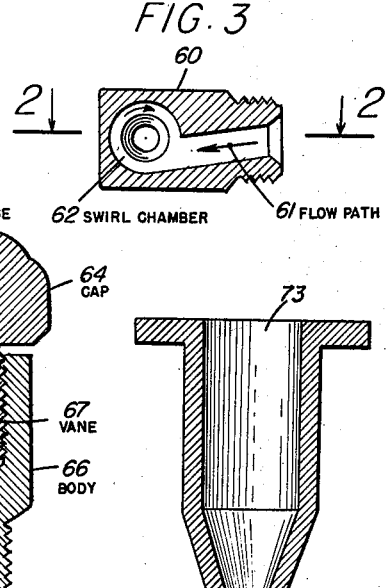
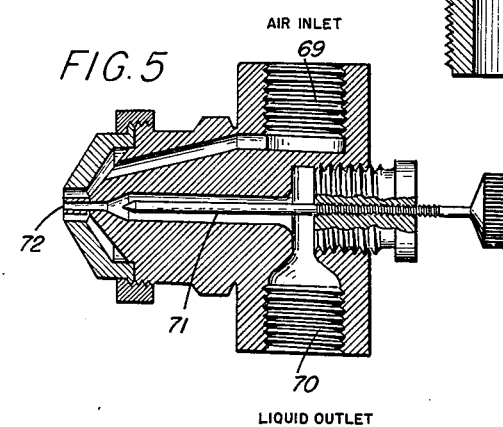
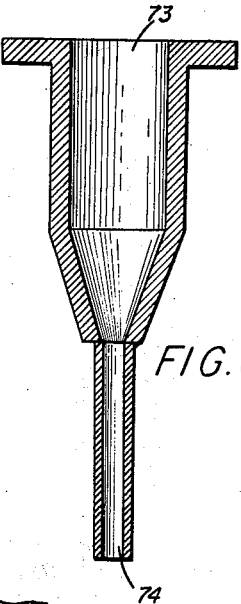
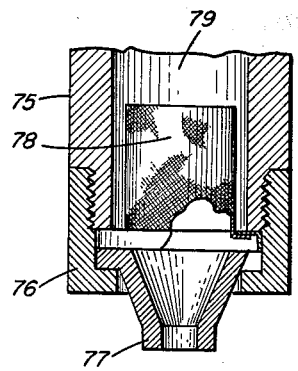
Inventors
John J. Gersic
Lawrence B. Nelson
Norman L. Malakoff
Harry T. Van Horn
By Charles A. Huggett
Attorney United States Patent Office 3,083,154
Patented Mar. 26, 1963

3,083,154
DEWAXING AND DEOILING PROCESS
John J. Gersic, Elmhurst, Norman L. Malakoff, Brooklyn, Lawrence B. Nelson, Garden City, and Harry T. Van Horn, Franklin Square, N.Y., assignors to Socony Mobil Oil Company, Inc., a corporation of New York
Filed Sept. 29, 1960, Ser. No. 59,280
8 Claims. (Cl. 208—31)

This invention relates to an improved process and apparatus for separating wax from a wax-oil mixture. The invention can be applied to the deoiling of wax containing variable amounts of oil or the dewaxing of oil containing variable amounts of wax. The invention relates particularly to an improved technique for obtaining directly from a waxy oil an oil of satisfactory or acceptable pour point as well as a wax of low oil content in a single operation. In a broad sense, however, the invention involves the separation of high pour point materials from a liquid or semi-liquid material to improve fluidity of the material.

A large amount of oil is processed in petroleum refineries to make commercially acceptable lubricating oils for internal combustion engines, machinery and other lubricating purposes. The lubricating oil stocks generally contain commingled with the oil differing amounts of wax. Unfortunately, this wax sets up at low temperature interfering with the flowability of the oil and hence must be removed to insure that the lubricating oil will have adequate pour, i.e., to insure that the oil will flow at a low temperature.

The general refining procedure followed in the past has been to gradually cool the waxy oil commingled with a suitable solvent having solvent power for the oil but limited solvent power for the wax. Wax crystals are formed in the mixture and then the mixture is passed through a rotary drum filter to remove the wax, forming a wax cake on the filter. Frequently the oil must be remixed with additional solvent, cooled and refiltered several times to effect a satisfactory removal of the wax and provide an oil of acceptable pour point. Furthermore, the wax scraped from the filter is found to have a substantial amount of oil, such as 30-40% by weight. The wax is therefore collected in a storage tank and from time to time the apparatus is used only to remove oil from the accumulated wax. This separate wax treatment severely limits the capacity of the filtering apparatus to produce the premium product, lubricating oil, reduces the efficiency of the operation and also increases the loss of solvent.

Other methods have been proposed for the separation of wax and oil. These methods are not now currently accepted or in use because of operational difficulties in adapting the methods to commercial practice. For instance, a process and apparatus for dewaxing and treating oils is disclosed in the United States Patents Nos. 2,137,549; 2,194,968; 2,218,518; 2,218,519; and 2,218,520. All of these patents describe a process of discharging a wax-oil mixture into cold solvent to form strings, ribbons, buttons or flakes. A leaching process is then used to remove the oil from the wax matrix which requires from fifteen minutes to two hours for completion, depending upon the wax mass. This is a long period of time and not consistent with usual refinery operation. The diffusion of oil away from the wax surface through the solvent is the time rate controlling step. This is a slow process and accounts for the considerable length of time needed for leaching to be completed. Aside from the considerable length of time needed to deoil the wax great care is called for in all of the above patents to prevent a breaking up of these large wax masses into smaller particles. These patents teach avoiding small particles at all costs as they are said to be difficult to remove and may find their way into the solvent-oil fraction and increase to an undesirable level the pour point of the resulting oil.

Another method for separating wax-containing materials is disclosed in the following patents: U.S. 2,301,965; 2,302,428; 2,302,432; and 2,302,433. The method disclosed in these patents commences by conventionally precipitating wax crystals from a solvent chosen because of special properties of gravity, viscosity, interfacial tension and oil solvent power. Such a solvent is difficult to obtain and is generally formed as a mixture of individual solvents as described in U.S. Patent No. 2,301,965. The conventional wax crystals obtained separate from the oil-solvent mixture due to the difference of gravity between the wax and the special solvent. The crystals are then forced through a nozzle into a countercurrent stream of deoiling solvent. Patent No. 2,302,432 states that this procedure is much more efficient than the usual method of washing wax by spraying solvent onto a wax cake deposited on a filter.

U.S. Patent No. 2,254,597 discloses a method of separating paraffin wax from oil which is dependent upon apparatus features. The charge material is injected into an acetone or acetone-benzol solvent and the wax is separated from the oil by a disclosed apparatus combination. The slurry of wax crystals, solvent and oil is fed into a shell filter with a filter and take-off line at the upper end. As the shell fills the filter retains the crystals and the oil-solvent passes through the wax cake and filter and out the take-off line. When the filtration is complete the position of the shell is reversed, bringing the take-off line to the bottom. Air is then pumped into the shell through a hollow trunnion displacing the liquid contents through the filtering medium leaving behind a wax filter cake. Wash solvent is then introduced into the shell and flows through the filter cake. Steam is then admitted to the tank, after the cake has been blown to remove the acetone, the wax filter cake melted and removed. The use of benzol in the solvent complicates the blowing procedure as it is not as readily evaporated as acetone. Benzol is not desirable in wax.

We have found that a vastly improved result can be obtained by spraying the waxy oil or oily wax into and beneath a bath of cold solvent under conditions which cause the charge to be distributed in the solvent as separate discrete particles of a carefully controlled size. Waxy oil is sprayed above the pour point and the oily wax is sprayed above its melting point. These small particles, having a size range of about 5-100 microns, are rapidly cooled by the solvent and the oil is removed from the wax particles by the solvent. In dewaxing, the mixture is passed to a standard filter, perhaps after passage through a cooler, and is filtered to provide a wax of very low oil content as well as an oil of acceptable pour point. Of course, the invention also contemplates and is used advantageously to remove oil from a wax containing a substantial volume of oil.

The improvements which this invention shows over known dewaxing and deoiling methods are:

(1) Utility requirements for heating and refrigeration are lower.

(2) Less solvent is needed. This reduces solvent losses during treating and recovery.

(3) An improvement in the rate of filtration of wax from oil. This increase in the speed of processing may be considerable, as is shown in the data, and has the effect of increasing processing capacity without capital investment for additional equipment.

(4) In dewaxing, produces a wax with a lower oil content than is now made by one stage of dewaxing. This wax requires less processing to be refined to a saleable product than wax produced by the present methods.

(5) In deoiling, produces a finished wax with less processing and a higher yield than conventional processes.

The object of this invention is to provide an improved method and means for deoiling wax and dewaxing oil.

A further object of this invention is to provide in a single operation the separation of wax and oil to produce directly oil of acceptable pour point and wax of low enough oil content for use without further oil reduction.

A further object of this invention is to provide a means of increasing the capacity of existing deoiling and dewaxing equipment.

These and other objects of the invention will be more clearly disclosed in the following detailed description of the invention which is to be read in conjunction with attached figures.

FIGURES 2 and 3 show, respectively, a vertical section and a horizontal section of a low pressure atomizing nozzle of a type useful in the practice of the invention.

FIGURE 4 shows a vertical section of a low pressure nozzle useful in forming droplets in the practice of the invention.

FIGURE 5 shows a pneumatic atomizing nozzle useful in forming droplets in the practice of the invention.

FIGURE 6 shows a hypodermic needle type injection device. In commercial practice this type device could be a small bore tube.

FIGURE 7 shows a solid stream injection device.

Figure 1:
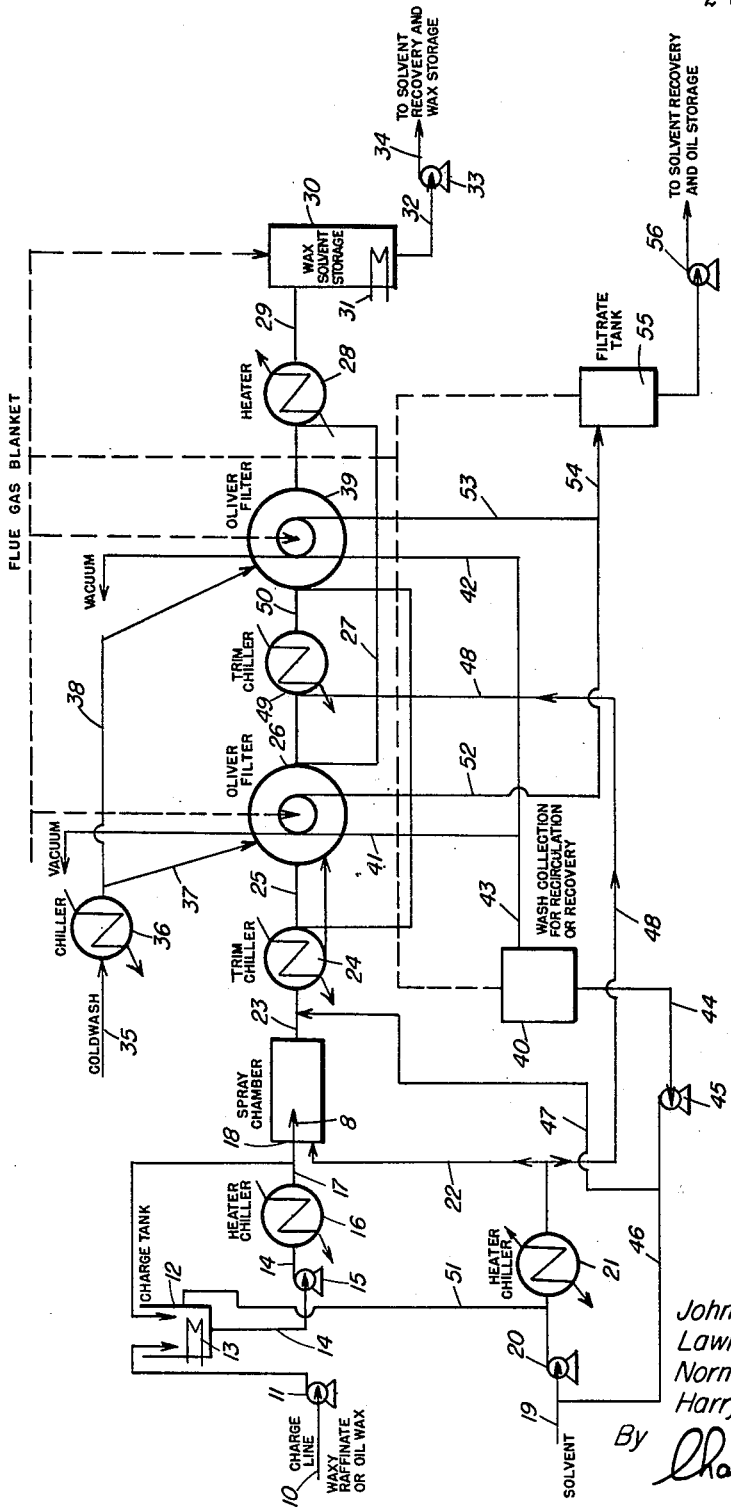
FIGURE 1 shows a schematic arrangement of dewaxing and deoiling equipment illustrating the invention.

Referring now to FIGURE 1, the process will be disclosed in further detail. The charge, either waxy oil above its pour point or oily wax above its melting point, is pumped through conduit 10 by pump 11 into a charge tank 12. The charge tank 12 has a heater 13 located therein to control the temperature of the charge. From the charge tank the charge is passed through conduit 14 by pump 15 and then through the heater-chiller 16 and conduit 17 into the spray chamber 18.

Detail 8 represents one or a group of nozzles, orifices or capillary tubes adapted to spray or atomize the charge into dispersed particles of a restricted small size. These nozzles will be disclosed in more detail hereinafter. The particles or droplets emerge within a bath of solvent in chamber 18 and are rapidly cooled to solidify the wax and make the oil more available to solvent action. The oil is rapidly taken up in the solvent. The solvent is introduced through conduit 19 by the pump 20 into the heater-chiller 21 and then through the conduit 22 into the spray chamber 18. The heater-chiller 21 is used to adjust the solvent temperature to that level below the charge temperature required to provide the rapid solidification of the wax in the sprayed droplets.

The effluent slurry from the spray chamber is then passed through conduit 23 and trim chiller 24, where the temperature of the slurry is adjusted prior to passage through the conduit 25 and into the rotary drum filter 26. A preferred solvent temperature for waxy oil is about +40° F. which must then be chilled to +5° F. to make acceptable (+20° F.) pour point oil. When deoiling an oily wax there is generally no need to trim chill as these slurries are usually filtered at about 30–40° F. This will, of course, depend upon the temperature of the solvent into which the oily wax is sprayed.

The wax from the filter is passed through the conduit 27, heater 28, and conduit 29 into the wax solvent storage tank 30. The solvent storage tank 30 contains a heater 31 which maintains the wax at a flowable temperature. The wax containing solvent is passed through conduit 32, pump 33 and conduit 34 to a solvent recovery and wax storage unit, not shown.

Fresh solvent is also introduced into the system through the conduit 35, chiller 36 to be passed either through conduit 37 to filter 26 or conduit 38 to filter 39 or both. The wash from either or both filters enters the collection tank 40 through the conduits 41, 42, and 43. The wash solvent can be transferred through conduit 44, pump 45 and conduit 46 for recirculation through the conduit 19. This solvent can also be recirculated through the conduit 47 or through the conduit 48. Fresh solvent or recirculated wash solvent can be introduced into the charge tank 12 by conduit 51 to cut back the charge stock with solvent.

The filtrate from filter 26, filter 39 or both passes through conduit 52, conduit 53 or both respectively into conduit 54 and then to filtrate tank 55. From the filtrate tank the filtrate is pumped by pump 56 to solvent recovery and oil storage, not shown.

The filter 39 is used in the event of the need for repulping of the wax from filter 26. This wax is mechanically mixed with solvent, passed through chiller 49 and conduit 50 and then onto filter 39. With this exception the process with repulping is exactly the same as the process without repulping, previously described.

An essential feature of this invention is the formation of wax-oil particles in the presence of a suitable solvent which is at a temperature below the melting point of the wax a sufficient amount to precipitate the wax as solid particles. Any of the solvents used in dewaxing or deoiling by conventional means, such as benzene- or toluene-ketone mixtures, propane, or other hydrocarbon solvents and chlorinated solvents may be used. The solvent system that is most widely used is methyl ethyl ketone either with toluene or benzene. Solvent temperatures from ambient to −60° F. have been used successfully. We have found it convenient to produce the droplets of the required size by means of a spray nozzle. Although other means of dispersion are possible, such as capillary tubes or orifices, the ease and convenience of spraying and its easy adaptability to procedures of refinery operation make this method the preferred scheme.

Solvent temperatures from +70° F. to −60° F. have been used successfully. The primary effect of filter temperature is to determine the melting point of the wax precipitated. In this invention a wax-oil mixture at a temperature such that it will flow is sprayed through a selected nozzle into the solvent. The nature of the wax and oil components and their relative amounts in the mixture determine the flow characteristics. It is preferable to spray waxy oils (about 20% wax) at about 100 to 150° F. and oily waxes (about 20% oil) at about 150 to 200° F. Solvent may be added to the wax-oil mixtures to reduce the temperature necessary for adequate flow. Nozzle pressure may also be increased at a given temperature to increase flow.

The temperature, heat capacity, and amounts of solvent and wax-oil sprayed determine the final temperature of the mixture. The temperature of the mixture may be adjusted by heating or cooling before filtration. In the production of oils with a pour point of about +20° F. it is necessary to filter the wax-solvent oil mixture at about +5° F. In deoiling waxes filtration temperatures of +20 to +120° F. may be used depending on the type of wax and the melting point desired. While an initial solvent temperature as low as −60° F. may be obtained in the laboratory, the solvent is usually chilled only to −20° F. for practical reasons. In dewaxing a waxy oil by spraying one volume of charge into two volumes of solvent at −20° F. a final temperature of about +40° F. is obtained. In order to make +20° F. pour oil it is necessary to chill this mixture to +5° F. and filter. Adjusting the temperature of the sprayed mixture has no adverse effect on the oil or wax recovered and may contribute to the improved filterability of the crystals.

In this process, it is necessary to form droplets of a size range about 5 to 100 microns. These drops are rapidly chilled in the cool solvent to solidify the wax.

The solidification takes only micro seconds to occur, after which the small initial particles agglomerate to a size that is easily filterable. The oil is washed into the solvent. Particles produced under conditions where the size is smaller than the minimum size have been deoiled by this process but are too small or filter at a slower rate. The filterability of this crystal is improved on aging but the time and special handling necessary for this would not be consistent with refinery operations. Particles produced under conditions where the size is greater than the maximum are not sufficiently deoiled to justify this operation economically.

FIGURE 2 of the drawings shows a vertical section, taken along line 2—2 of FIGURE 3, of a typical low pressure atomizing nozzle found useful for the initial mechanical atomization. The nozzle is composed of a body 60 containing an inlet passage 61, which enters swirl chamber 62 tangentially so that the material passing into chamber 62 has a vortical motion. Here, material swirls around and down, acquiring increasing tangential velocity components. Below the swirl chamber, replaceable orifice cap 63 is secured to body 60 as shown. Material issues from the orifice as a hollow conical sheet which atomizes into a so-called "hollowcone spray." The diameter of a typical orifice cap 63 useful herein is 0.0625 inch. This nozzle is supplied by Spraying Systems Company, as 1/8 B-1 Whirljet nozzle. Particle size and throughput characteristics of the nozzle can be regulated by varying the nozzle body size which alters the entrance diameter (or inlet passage 61) and swirl chamber (62) sizes, and by varying the orifice diameter which can be changed independently by substituting orifice caps with different orifice diameters. Varying the feed pressure to the nozzle also varies throughput.

FIGURE 3 is a horizontal section of the nozzle of FIGURE 2, taken along line 3—3 of FIGURE 2.

Another low-pressure nozzle used successfully is the one illustrated in FIGURE 4. This nozzle, having a 0.047 inch orifice is supplied by Spraying Systems Company as 1/8 GG-2 Fulljet nozzle. The nozzle is composed of a cap 64 which contains the orifice 65. Into this cap, which is removable from the body 66, is inserted a removable internal vane 67. When charge is introduced through inlet passage 68 it impinges upon the vane 67 causing the material to assume a swirling motion as it issues forth from orifice 65 in a full cone spray pattern of uniform distribution. Atomization is determined by pressure and capacity.

A pneumatic atomizing nozzle illustrative of the type used, is shown in FIGURE 5. In this type of nozzle liquid and air or gas are mixed externally, that is after leaving the nozzle. The air is introduced via air inlet 69 and charge material via liquid inlet 70. The liquid travels up past the needle valve 71 and out through the orifice 72 where it is atomized by the air. The needle valve can be adjusted to vary the proportion of air to charge at the nozzle. Nozzle unit, FIGURE 5, supplied by Spraying Systems Company as round spray pneumatic atomizing nozzle, was used successfully in our experimental work.

In place of the atomizing device illustrated in FIGURES 2, 3, 4 and 5, other such devices known in the art can be used. For example, the following can be mentioned: impinging jet nozzles, centrifugal or rotating disc atomizers, vibrating atomizers, multi-jet atomizers, impact type nozzles, high pressure type atomizing nozzles and other liquid dispersing devices.

A typical nozzle of orifice diameter from 0.020 to 0.075 inch will give the desired particle distribution for efficient deoiling with pressures from 10 to 200 p.s.i.g. Below 10 p.s.i.g. a particle size will be obtained such that deoiling is not rapid enough to be consistent with usual refinery operations. If these larger particles are allowed to remain in contact with the solvent for a period of time deoiling will take place. At pressure in the excess of 200 p.s.i.g. the particles formed are efficiently deoiled but of such a small size that even when agglomeration takes place the filter rate is adversely influenced. If a more porous filter medium is used to speed up the filter rate in the above case, wax agglomerates pass through into the oil-solvent mixtures which causes the formation of a high pour point oil.

The data from laboratory tests illustrating the utility of the invention are found in the following Tables I, II and III. The data show successful application of the invention to dewaxing light, heavy and residual raffinates; oils of +20° F. pour point were obtained and in addition a wax superior to that obtained by conventional methods. It is noted that the filter rates in accordance with this process are superior to those rates obtained in any other way. The column headings are generally self-

TABLE I

*Light Distillate*

| Conditions | Laboratory using refinery variable | Actual refinery data | Spray laboratory | | |
|---|---|---|---|---|---|
| Solvent composition (MEK-toluol) | 70/30 | Ca. 70/30 | 70/30 | 70/30 | 70/30 |
| Dilution ratio: | | | | | |
| Primary | [1] 0.3 | 0.5 | 2.0 | 2.0 | 2.0 |
| Secondary | [2] 0.6 | 0.5 | | | |
| Tertiary | [3] 0.6 | [4] 2.0 | | | |
| Total | 1.5 | 3.0 | 2.0 | 2.0 | 2.0 |
| Wash ratio | 0.7 | 2.0 | 1.0 | 1.0 | 1.0 |
| Slurry cooling rate, °F./min | 2.8 | | | | |
| Filtration temp., °F | +3 | +5 | +5 | +5 | +5 |
| Equiv. filter speed, minutes per revolution of filter drum | 2 | | 2 | 1 | 1 |
| Equiv. submergence, percent | 50 | | 50 | 50 | 50 |
| Vacuum, in. Hg: | | | | | |
| Pickup | 12.5 | | 20 | 20 | 20 |
| Wash | 20 | | 20 | 20 | 20 |
| Percent solvent in cake | 57.3 | | 82.8 | 80.9 | 74.7 |
| Cake thickness, in | 6/32 | | 22/32 | 12/32 | 16/32 |
| Percent yield: | | | | | |
| Wax | 12.3 | 25.0 | 10.6 | 12.2 | 21.3 |
| Oil | 87.7 | 75.0 | 89.4 | 87.8 | 78.7 |
| Wax: | | | | | |
| Solidification point, °F | 133 | 121 | 128 | 126 | 119 |
| Oil, percent | 0.9 | 30.0 | 0.64 | 1.98 | |
| Oil: | | | | | |
| Pour, °F | +15 | +20 | +20 | +20 | +20 |
| Filtration rate, gallons of dewaxed oil per square foot of filter area per hour | 7.7 | 6.5 | 17.5 | 20.1 | 15.1 |

[1] At 120° F./115° F.   [2] At 88° F./77° F.   [3] At 0° F.   [4] Recirculate.

TABLE II

Heavy Distillate

| Conditions | Laboratory using refinery variables | Actual refinery data | Spray laboratory | |
|---|---|---|---|---|
| Solvent composition (MEK-toluol) | 50/50 | 50/50 | 50/50 | 50/50 |
| Dilution ratio: | | | | |
| Primary | 3.3 | 1.2 | 2.0 | 4.0 |
| Secondary | | 2.5 | | |
| Tertiary | | | | |
| Total | 3.3 | 3.7 | 2.0 | 4.0 |
| Wash ratio | 0.9 | 0.9 | 1.0 | 1.0 |
| Slurry cooling rate, °F./min | 12.3 | | | |
| Filtration temp., °F | | 0 | +5 | +5 |
| Equiv. filter speed, minutes per revolution of filter drum | 3 | | 2 | 2 |
| Equiv. submergence, percent | 50 | | 50 | 50 |
| Vacuum, in. Hg: | | | | |
| Pickup | 5 | | 20 | 20 |
| Wash | 20 | | 20 | 20 |
| Percent solvent in cake | | | 73.2 | 90.6 |
| Cake thickness, in | 14/32 | | 13/32 | 19/32 |
| Percent yield: | | | | |
| Wax | 29.6 | 27.0 | 30.2 | 12.2 |
| Oil | 70.4 | 73.0 | 69.8 | 87.8 |
| Wax: | | | | |
| Solidification point, °F | 139 | 140 | 133 | 146 |
| Oil, percent | | | | |
| Solvent composition | 50/50 | 50/50 | 50/50 | 50/50 |
| Oil: | | | | |
| Pour, °F | +20 | +20 | +20 | +25 |
| Filtration rate, gallons of dewaxed oil per square foot of filter area per hour | 3.0 | 1.8 | 4.2 | 2.8 | explanatory. Laboratory spray data is data obtained by spraying in the laboratory on a bench scale. Actual refinery data is data obtained on commercial refinery wax-oil separation equipment. Laboratory data using refinery variables and laboratory data refer to bench scale experiments using conditions in one case as close as possible to refinery conditions and in the latter case to bench scale experiments using optimum laboratory conditions. Table IV provides data showing the results of deoiling a variety of waxes. The data in Table IV is arranged according to the MEK/toluene ratio used. Examples are also included which show that other solvents also are applicable, as are other starting materials. In all cases a significant reduction in oil content of the starting material is noted.

TABLE III

Distillation Residue

| Conditions | Laboratory using refinery variables | Actual refinery data | Spray laboratory |
|---|---|---|---|
| Solvent composition (MEK-toluol) | 50/50 | 50/50 | 50/50 |
| Dilution ratio: | | | |
| Primary | 2.0 | 3.8 | 2.0 |
| Secondary | | | |
| Tertiary | | | |
| Total | 2.0 | 3.8 | 2.0 |
| Wash ratio | 1.0 | 0.9 | 1.0 |
| Slurry cooling rate, °F./min | 15.1 | | |
| Filtration temp., °F | 0 | +2 | +1 |
| Equiv. filter speed, minutes per revolution of filter drum | 4 | | 4 |
| Equiv. submergence, percent | 50 | | 50 |
| Vacuum, in. Hg: | | | |
| Pickup | 20 | | 20 |
| Wash | 20 | | 20 |
| Percent solvent in cake | 64 | | 64.9 |
| Cake thickness, in | 3/32 | | 3/32 |
| Percent yield: | | | |
| Wax | 17.0 | 23.0 | 25.9 |
| Oil | 83.0 | 77.0 | 74.1 |
| Wax: | | | |
| Solidification point, °F | 149 | 166 | 153 |
| Oil, percent | | 12.0 | 8.6 |
| Solvent composition | 50/50 | 50/50 | 50/50 |
| Oil: | | | |
| Pour, °F | +20 | +25 | +20 |
| Filtration rate gallons of dewaxed oil per square foot of filter area per hour | 1.3 | 1.3 | 1.6 |

Table IV

Deoiling

[Spraying into solvent at lower than ambient temperature]

| Wax | MEK/TOL | Prim. dil. | Prim. dil. filter temp. °F. | Repulp ratio | Repulp temp., °F. | Wash ratio | Wash temp., °F. | Oil, percent | Pene. @77° F. | Sol. pt., °F. | Yield, percent Weight |
|---|---|---|---|---|---|---|---|---|---|---|---|
| Ketone scale | 70/30 | 8:1 | 30 | 2:1, 3:1 | 30 | 2:1, 1:1, 1:1 | 30 | 0.06 | 17.5 | 131 | 75 |
| Distillate petrolatum | 60/40 | 6:1 | 40 | 3:1, 2:1 | 40 | 2:1 | 40 | Nil | 17.5 | 153 | 23 |
|  | 50/50 | 6:1 | 40 | 3:1 | 40 | 1:1, 2:1 | 40 | 0.74 | 19.0 | 159 | 30 |
| Residual petrolatum | 50/50 | 6:1 | 30 | 3:1 | 5 | 1:1 | 5 | 0.20 | 21.0 | 163 | 53 |
| 70/30 mixture: | | | | | | | | | | | |
| Residual | 50/50 | 2:1 | 30 | 3:1 | 5 | 1:1 | 5 | 2.09 | 25.5 | 161 | 44 |
| and | | | | | | | | | | | |
| Distillate petrolatums | 50/50 | 6:1 | 30 | 3:1 | 5 | 1:1 | 5 | 1.86 | 31.0 | 156 | 54 |
| Charge stocks: | | | | | | | | | | | |
| Ketone scale | | | | | | | | 10.9 | 58.0 | 126 | |
| Distillate petrolatum | | | | | | | | 30.2 | 195.5 | | |
| Residual petrolatum | | | | | | | | 7.5 | | 167 | |
| 70/30 mixture residual and distillate petrolatums | | | | | | | | 12.7 | 167.5 | 154 | |
| Refinery data: | | | | | | | | | | | |
| Ketone scale | 70/30 | 7.9:1 | 30 | 2:1, 3:1 | 30 | 1.6:1, 1.6:1, 1.6:1 | 30 | 0.05 | | 133 | 79 |
| Distillate petrolatum | 60/40 | 6:1 | 38 | 3.2:1, 3.2:1 | 38 | 1.8:1, 2:1, 2:1 | 37 | 1.2 | | | 37 |
| 70/30 Mixture: | | | | | | | | | | | |
| Residual | 50/50 | 7.3:1 | 50 | | | 1.3:1 | 50 | | 22/32 | 170 | 42 |
| and | | | | | | | | | | | |
| Distillate petrolatums | 50/50 | 6.4:1 | | 1.2:1 | | 0.6:1 | | 2.5 | 30 | 164 | 43 |

TABLE V

*Effect of MEK/Toluol Ratio on Oil Content and Yield*

| Solvent ratio MEK/toluol | Primary dilution | Filter temperature, °F. | Repulp [2] | Wash repulp temperature °F.[3] | | Oil, percent | M.P., °F. | Penetration at 77° F. | Yield, percent |
|---|---|---|---|---|---|---|---|---|---|
| Ketone scale wax: [1]-a | | | | | | | | | |
| 100/0 | 6:1 | 75 | (3:1)2 | 75 | 1:1 | 0.12 | 136 | 14.5 | 66.9, 68.3 |
| 95/5 | 6:1 | 72 | (3:1)2 | 72 | 1:1 | 0.20 | 139 | 13.5 | 54.2, 64.1 |
|  | [4]6:1 | 75 | (3:1)2 | 75 | 1:1 | 0.26 | 133 | 16.5 | 73.6, 75.7 |
|  | 6:1 | 77 | 3:1 | 77 | 1:1 | 0.33 | 138 | 14.5 | 57.9 |
|  | 4:1 | 74 | (3:1)3 | 74 | 1:1 | 0.33 | 136 | 14.0 | 63.1, 63.6 |
|  | 2:1 | 75 | (3:1)2 | 75 | 1:1 | 0.36 | 135 | 15.0 | 62.1 |
|  | 4:1 | 69 | (3:1)2 | 69 | 1:1 | 0.36 | 137 | 14.0 | 57.3 |
|  | 4:1 | 72 | 3:1 | 72 | 1:1 | 0.47 | 136 | 15.5 | 58.9 |
| 90/10 | 6:1 | 94 | (3:1)2 | 70 | 1:1 | 0.07 | 142 | 12.0 | |
|  | 6:1 | 94 | 3:1 | 77 | 1:1 | 0.28 | 141 | 13.0 | |
| 70/30 | 6:1 | 93 | (3:1)2 | 72 | 1:1 | 0.05 | 145 | 12.0 | |
|  | 2:1 | 117 | 3:1 | 76 | 1:1 | 0.26 | 140 | 14.0 | 51.1 |
|  | 6:1 | 94 | 3:1 | 76 | 1:1 | 0.29 | 145 | 13.0 | |
| 50/50 | 4:1 | 68 | 3:1 | 68 | 1:1 | Nil | 145 | 12.5 | 33.1 |
|  | 6:1 | 91 | 3:1 | 71 | 1:1 | 0.13 | 143 | 14.5 | 45.0 |
|  | 2:1 | 70 | 3:1 | 70 | 1:1 | 0.30 | 143 | 13.5 | 44.3 |
|  | 6:1 | 94 | | 77 | 1:1 | 0.36 | 139 | 14.5 | 45.1 |
|  | 6:1 | 92 | | 77 | 1:1 | 0.49 | 143 | 17.5 | 39.0 |
|  | 6:1 | 72 | (3:1)2 | 72 | 1:1 | 0.49 | 143 | 12.0 | 21.3, 21.8 |
| Petrolatum [1]-b 50/50 | 6:1 | 99 | | 73 | 1:1 | 1.80 | 168 | 15.5 | |
|  | 6:1 | 73 | | 73 | 1:1 | 3.89 | 168 | 21.0 | 27.3, 27.7 |
|  | 4:1 | 71 | | 71 | 1:1 | 4.15 | 168 | 23.5 | 33.1 |
|  | [4]4:1 | 70 | | 70 | 1:1 | 5.16 | 165 | 29.5 | 31.4, 31.8 |
| Heavy distillate slack wax [1]-c 100/0 [5] | 38:1 | 68 | | 68 | 1:1 | 3.69 | 159 | 21.5 | |
| Crude scale wax [1]-d 100/0 | 38:1 | 70 | | 70 | 1:1 | 0.08 | 140 | 12.5 | |
| Acetone | 38:1 | 54 | | 60 | 1:1 | 0.06 | 132 | 12.5 | |

[1] Properties of starting waxes:

| | M.P. °F. | Penetration at 77° F. | Oil content, percent |
|---|---|---|---|
| a Ketone scale wax | 126 | 54.5 | 11.15 |
| b Petrolatum | 154 | 167.5 | 12.69 |
| c Heavy distillate slack wax | 137 | 111.5 | 21.53 |
| d Crude scale wax | 127 | 24.5 | 1.62 |

[2] Notation (3:1)2 indicates that the repulp operation was repeated twice using 3 volumes of solvent to 1 volume of original charge. (3:1)3 indicates 3 repulp stages.
[3] The indicated wash ratio was used following each filtration.
[4] Solvent saturated with water at the indicated temperature used.
[5] The last three examples show the versatility of our process with different starting crude waxes and solvents.

FIGURE 6 shows a simple fluid introduction device made in the form of a hypodermic needle. These needles can be prepared in a variety of diameters and afford a simplified method of adjusting orifice diameter to vary deoiling and dewaxing efficiency. The charge material enters the inlet 73 and issues from the end of the hollow needle 74 in a fine stream which then breaks up into particles. Hypodermic needles are sold commercially by number index which refers to needle diameter. Needle numbers and the corresponding diameters used successfully in practicing this invention were as follows:

| No. 13 | 0.072" |
| No. 15 | 0.057" |
| No. 17 | 0.0453" |
| No. 19 | 0.0359" |
| No. 22 | 0.0253" |

FIGURE 7 shows another nozzle used successfully in laboratory spray experiments demonstrating the practice of the invention. This nozzle is composed of a body 75, a cap 76 which holds the orifice insert 77 and an internal strainer 78. The liquid enters at inlet 79, passes through the strainer 78 and exits from the orifice 77. The material which issues from the orifice is in the form of a solid stream which subsequently breaks up into particles. Such a nozzle is supplied by Spraying Systems Company as 1/4 TT0004-0° solid stream nozzle. A typical orifice diameter found acceptable for use in practicing this invention is 0.046 inch and this orifice utilizes a 50 mesh screen as the strainer.

While this invention has particular application to the removal of wax from waxy oil or the separation of oil of oily wax, it can be applied to the removal of high pour materials from various carrier liquids. The solvent can be considered broadly to be a medium having solvent power for the liquid and little or no solubility for the high pour or solid material at the temperature at which the materials are separated. For example, experiments have been successfully made using water and an emulsifier as the solvent and substantial amounts of oil were removed by this solvent from a crude wax. For example, using an anionic emulsifier the oil content of a ketone scale wax was lowered from 12% by weight to 4% by weight. The results of laboratory tests using water with various surfactants as the solvent medium and ketone scale wax as the starting material are shown in Table VI.

TABLE VI

*Spray Deoiling Using Water*

KETONE SCALE WAX*

| Emulsifier system | 1° dil. | Filter temp., °F. | Repulp | Temp., °F. | Wash | Temp., °F. | Oil, percent | M.P., °F. | Yield, percent wax |
|---|---|---|---|---|---|---|---|---|---|
| Nonionic [2] in tap water | 6:1 | 65 | | | 1 1:1 | 30 | 8.9 | 128 | 93.6 |
| Do.[2] | 6:1 | 65 | 3:1 | 75 | 1 1:1 | 30 | 8.6 | 123 | 89.0 |
| Do.[2] | 8:1 | 65 | 2:1 | 65 | 1:1 | 65 | 6.9 | 127 | 86.4 |
| Nonionic [3] in charge | | | 3:1 | | 2:1 | 65 | | | |
| | | | | | 1 1:1 | 30 | | | |
| Anionic [4] and tap water | 8:1 | 90 | 2:1 | 85 | 1:1 | 85 | 7.1 | 127 | 90.4 |
| | | | 3:1 | | 2:1 | 85 | | | |
| | | | | | 1 1:1 | 30 | | | |
| Anionic [5] and tap water | 8:1 | 100 | 2:1 | 90 | 1:1 | 90 | 5.7 | 129 | 80.6 |
| | | | 3:1 | | 2:1 | 90 | | | |
| | | | | | 1 1:1 | 30 | | | |
| Anionic [4] and tap water | 8:1 | 100 | 2:1 | 90 | 1:1 | 90 | 4.2 | 130 | 81.7 |
| | | | 3:1 | | 2:1 | 90 | | | |
| | | | | | 1 1:1 | 30 | | | |

[1] Last wash is acetone at 30° F. Acetone is used to displace as much of the water as possible from the filter cake prior to processing the wax.
[2] Triton X-100.
[3] Triton X-45.
[4] Ammonium oleate surfactant formed by interaction of ammonium hydroxide in water and oleic acid in charge.
[5] Ammonium stearate surfactant formed by interaction of ammonium hydroxide in water and stearic acid in charge.

*See the following table:

| Property of starting wax | M.P., °F. | Oil, percent |
|---|---|---|
| Ketone scale wax | 125 | 12.6 |

It is noted from Table VI that when anionic surfactants were used, the active ingredients for the formation of the anionic were split between the water and the charge. Thus, when the surfactant was ammonium oleate, ammonium hydroxide was added to the water into which the charge containing oleic acid was sprayed. In this way the surfactant is formed at the time of spraying and is more effective in emulsifying the liberated oil. When just one non-ionic was used it was dissolved in the appropriate medium. Triton X-100 (trade name) was added to the water and Triton X-45 (trade name) to the charge. The Tritons are branded products available commercially from Rohm and Haas Company and are alkyl aryl polyether alcohols. Depending upon chain length, they are either water- or oil-soluble materials.

Some oil fields produce a heavy crude such as Guario, Esquina and Mata. These crudes, because of high pour waxy or wax-like materials, are not easily pumped or handled. It is, therefore, desirable to remove the high pour material from these crudes as the crude oil is removed from the ground so that the oil may be more conveniently handled in transit to the refinery. The separation required is a simple separation without the necessity for highly efficient separation. Experiments were successfully completed using both Sovasol #5, trade name of Socony Mobil Oil Company, Inc., a light petroleum distillate fraction having good solvent power for oil, and methyl ethyl ketone. The ketone gave a better quantitative separation than the petroleum distillate fraction. The ketone would have to be distilled, however, from the crude oil whereas the distillate fraction could be left in the crude oil and sold with the oil.

There are many other materials which can be used in place of the distillate fraction and the methyl ethyl ketone. A liquefied petroleum gas may be used as the solvent, or a crude may be topped to provide a distillate and the residual oil sprayed into the tops, or a waxy crude can be sprayed into a crude of low wax content. The advantage of each of these "solvents" is that only a filtration is required to remove the high pour waxy or wax-like materials and the "solvent" can remain with the dewaxed crude, thus eliminating the need for distillation. The results of laboratory tests using methyl ethyl ketone and Sovasol No. 5 (trade name for distillate petroleum fraction) are shown in Table VII as follows:

TABLE VII

*Removal of High Pour Materials From Crude by Spray Processing*

| Crude | Type | Grav., °API | Solvent | Dil. 1° | Filter temp., °F. | Wash | Temp., °F | Chg. temp.,[1] °F. | Crude yield, percent | Wax oil content, percent | Wax M.P., °F. | Wax yield, percent |
|---|---|---|---|---|---|---|---|---|---|---|---|---|
| Esquina-Venezuela | Naphthenic-paraffinic | 40.7 | MEK | 3:1 | 50 | 1:1 | 50 | 80 | 83.1 | 9.1 | 145 | 16.3 |
| Do | do | 40.7 | Sovasol #5 | 3:1 | 0 | 1:1 | 0 | 80 | 91.5 | 26.2 | 133 | 7.9 |
| Guario-Venezuela | Intermediate paraffinic | 44.4 | MEK | 3:1 | 50 | 1:1 | 50 | 80 | 79.3 | 17.2 | 132 | 20.0 |

[1] The charge temperature is the temperature of the crude at the time of spraying.

Although this invention has been described with preferred embodiments, it is to be understood that modifications and variations may be used; without departing from the spirit and scope of the invention, as those skilled in the art will readily understand. Such variations and modifications are considered within the purview of the attached claims.

We claim:

1. A process for separating wax and oil which comprises providing the wax-oil mixture at a flowable temperature, maintaining a liquid solvent bath at a temperature below the solidification temperature of the wax in said wax-oil mixture, conducting the mixture in flowable form to beneath the surface of the bath of solvent, spraying the wax-oil mixture into said bath so as to emerge therein as particles or droplets of a size about 5–100 microns, separating the wax particles from the solvent and oil and separating oil from said solvent whereby a wax of low oil content and an oil of acceptable pour point is produced.

2. The method of separating wax from an oil in which it is commingled which comprises providing said oil at a flowable temperature, cooling a stream of liquid solvent to a temperature below the melting point of the wax, conducting the oil in flowable form to beneath the surface of the stream of liquid solvent and then spraying the oil into the stream of liquid solvent so as to emerge therein as particles or droplets of a size about 5–100 microns, maintaining the solvent and oil particles in contact for a period of time sufficient to solidify the wax and dissolve the oil exuded from the solidified wax particles in said solvent, passing the wax particles and commingled oil-solvent through a filter, under conditions to separate a low oil content wax and an oil-solvent mixture free of wax particles, separating solvent from said oil-solvent mixture to provide an oil of a pour point not greater than about +20° F.

3. The method of substantially reducing the oil content of an oily wax which comprises providing said oily wax at a flowable temperature, maintaining a bath of liquid solvent medium at a temperature below the solidification temperature of the wax, as measured after said oily wax is commingled with the solvent medium, conducting the oily wax in flowable form to beneath the surface of the bath of solvent and then spraying the oily wax into the bath of solvent so as to emerge therein as particles or droplets of a size about 5–100 microns, maintaining the droplets in said bath of solvent medium for a period of time sufficient to substantially free the wax of oil and separating the wax from the oil and solvent, thereby producing a wax of substantially reduced oil content.

4. The method of substantially reducing the oil content of an oily wax which comprises heating said oily wax to a temperature above the melting point of the wax, maintaining a bath of liquid solvent for said oil at a temperature below the solidification temperature of the wax, as measured after said oily wax is commingled with the solvent, conducting the oily wax in flowable form to beneath the surface of the bath of solvent medium and then spraying the oily wax into the bath of solvent medium so as to emerge therein as particles or droplets of a size about 5–100 microns, maintaining the droplets in said bath of solvent for a period of time sufficient to substantially free the wax of oil and separating the wax from the oil and solvent, thereby producing a wax of substantially reduced oil content.

5. The method of substantially reducing the oil content of an oily wax which comprises heating said oily wax to a temperature above the melting point of the wax, maintaining a bath of liquid solvent for said oil at a temperature below the solidification temperature of the wax, as measured after said oily wax is commingled with the solvent, conducting the oily wax in flowable form to beneath the surface of the bath of solvent and then spraying the oily wax into the bath of solvent so as to emerge therein as particles or droplets of a size about 5–100 microns, maintaining the droplets in said bath of solvent for said oil for a time period ranging about 1 to 10 minutes, to substantially free the wax of oil, filtering the wax from the mixture and separating the oil and solvent.

6. The method of substantially reducing the wax content of a waxy oil which comprises heating said waxy oil to a temperature above the melting point of the wax, maintaining a bath of liquid solvent medium at a temperature below the solidification temperature of the wax, as measured after said waxy oil is commingled with the solvent medium, conducting the waxy oil in flowable form to beneath the surface of said bath of solvent and then spraying the waxy oil into the bath of solvent so as to emerge therein as particles or droplets of a size about 5–100 microns, maintaining the droplets in said bath of solvent medium for a period of time sufficient to substantially free the oil of wax, separating the wax from the oil and solvent medium and separating the solvent medium from the oil, whereby an oil of low pour point is directly prepared.

7. The method of substantially reducing the wax content of a waxy oil which comprises heating said waxy oil to a temperature above the melting point of the wax, maintaining a bath of liquid solvent for said oil at a temperature below the solidification temperature of the wax, as measured after said waxy oil is commingled with the solvent, conducting the waxy oil in flowable form to beneath the surface of the bath of solvent and then spraying the waxy oil into the bath of solvent so as to emerge therein as particles or droplets of a size about 5–100 microns, maintaining the droplets in said bath of solvent for a period of time sufficient to substantially free the wax of oil, separating the wax from the oil and solvent, and separating the solvent from the oil, whereby an oil of low pour point is produced.

8. The method of substantially reducing the wax content of a waxy oil which comprises heating said waxy oil to a temperature above the melting point of the wax, maintaining a bath of liquid solvent for said oil at a temperature below the solidification temperature of the wax, as measured after said waxy oil is commingled with the solvent, conducting the waxy oil in flowable form to beneath the surface of the bath of solvent and then spraying the oily wax into the bath of solvent so as to emerge therein as particles or droplets of a size about 5–100 microns, maintaining the droplets in said bath of solvent for said oil for a time period ranging about 1 to 10 minutes, to substantially free the wax of oil, filtering the wax from the mixture, separating the solvent from the oil, whereby an oil of acceptable pour point is directly produced.

References Cited in the file of this patent

UNITED STATES PATENTS

| | | |
|---|---|---|
| 2,116,144 | Dickinson | May 3, 1938 |
| 2,301,965 | Mauro et al. | Nov. 17, 1942 |
| 2,370,453 | Dons et al. | Feb. 27, 1945 |